United States Patent
Ahmed et al.

(10) Patent No.: US 8,554,792 B1
(45) Date of Patent: Oct. 8, 2013

(54) METHOD AND SYSTEM FOR PROVIDING CONTENTS AVAILABLE ON THE INTERNET TO MOBILE HANDSET

(75) Inventors: Shahid Ahmed, Monmouth Jct., NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 308 days.

(21) Appl. No.: 12/560,052

(22) Filed: Sep. 15, 2009

(51) Int. Cl.
   *G06F 17/30* (2006.01)

(52) U.S. Cl.
   USPC .................. 707/781; 709/203; 455/432.1

(58) Field of Classification Search
   USPC ......... 707/913, 781; 709/231, 203; 455/425, 455/419, 558, 411, 466, 436, 432.1, 412.1, 455/414.1
   See application file for complete search history.

(56) References Cited

U.S. PATENT DOCUMENTS

| | | | |
|---|---|---|---|
| 7,363,035 B2 * | 4/2008 | Reilly ........................ | 455/432.3 |
| 7,401,320 B2 * | 7/2008 | Brunet et al. ................ | 717/101 |
| 7,542,430 B2 * | 6/2009 | Lin et al. ...................... | 370/252 |
| 7,962,640 B2 * | 6/2011 | Lee .............................. | 709/231 |
| 8,250,565 B2 * | 8/2012 | Marolia et al. ................ | 717/173 |
| 8,261,231 B1 * | 9/2012 | Hirsch et al. .................. | 717/100 |
| 2002/0072359 A1 * | 6/2002 | Moles et al. ................... | 455/425 |
| 2003/0162533 A1 * | 8/2003 | Moles et al. ................... | 455/419 |
| 2005/0153741 A1 * | 7/2005 | Chen et al. .................... | 455/558 |
| 2006/0014523 A1 * | 1/2006 | Reilly ........................ | 455/412.1 |
| 2006/0068818 A1 * | 3/2006 | Leitersdorf et al. .......... | 455/466 |
| 2006/0129638 A1 * | 6/2006 | Deakin ........................ | 709/203 |
| 2008/0115148 A1 * | 5/2008 | Paila ............................ | 719/316 |
| 2008/0153468 A1 * | 6/2008 | Reilly ........................ | 455/414.2 |
| 2008/0201489 A1 | 8/2008 | Morinaga | |
| 2009/0006643 A1 * | 1/2009 | Lee .............................. | 709/231 |
| 2009/0163140 A1 * | 6/2009 | Packham et al. ............. | 455/41.2 |
| 2009/0163182 A1 * | 6/2009 | Gatti et al. ................... | 455/414.1 |
| 2010/0062770 A1 * | 3/2010 | Flynn et al. ................... | 455/436 |
| 2010/0273450 A1 * | 10/2010 | Papineau et al. ............. | 455/411 |
| 2012/0088477 A1 * | 4/2012 | Cassidy ...................... | 455/414.1 |

\* cited by examiner

*Primary Examiner* — Jean M Corrielus (57) ABSTRACT

An application server provides optimized contents or services obtainable over the Internet to wireless mobile communication devices. The application server, which may be operated by wireless communication provider pre-loads templates and mapping information appropriate for diverse wireless communication device models in its memory. The server provides contents or services requested by the wireless communication devices which is optimized according to the pre-loaded configurations and templates. A wireless communication device receives the optimized contents or services and renders the contents or services for display. The pre-loaded configuration and templates specific to each of the wireless communication devices in server memory enables the wireless communication devices to avoid experience disruption of currently running services and reduce any delay in rendering the requested contents or services.

27 Claims, 7 Drawing Sheets

| Param_App_Id | Param_Name | Param_Value |
|---|---|---|
| BB_CURVE_CONTENT_FLAG | HEADER_ON | YES |
| BB_CURVE_CONTENT_FLAG | LOGO_ON | YES |
| BB_CURVE_CONTENT_FLAG | PAGE_TITLE_ON | NO |
| BB_CURVE_CONTENT_FLAG | AD_ON | YES |
| BB_CURVE_CONTENT_FLAG | FOOTER_ON | NO |
| BB_CURVE_CONTENT_FLAG | ICON_MENU_ON | YES |
| BB_CURVE_CONTENT_FLAG | RSS_FEED_ON | NO |
| BB_CURVE_CONTENT_FLAG | STREAM_ON | NO |
| BB_CURVE_CONTENT_FLAG | GLOBAL_ALERT_ON | NO |
| BB_CURVE_CONTENT_FLAG | PERSON_MSG_ON | NO |
| BB_CURVE_CONTENT_FLAG | ICON_1_ON | YES |
| BB_CURVE_CONTENT_FLAG | ICON_2_ON | YES |
| BB_CURVE_CONTENT_FLAG | TEXT_LINK_1_ON | YES |
| BB_CURVE_CONTENT_FLAG | TEXT_LINK_2_ON | YES |

FIG. 5

| Param_App_Id | Param_Name | Param_Value |
|---|---|---|
| BB_CURVE_CONTENT | LOGO | /images/company_logo.png |
| BB_CURVE_CONTENT | PAGE_TITLE | "Your homepage" |
| BB_CURVE_CONTENT | AD_URL | http://srvr.ad-company.com/mobile/banner?id=123 |
| BB_CURVE_CONTENT | ICON_1 | /images/icon_1.png |
| BB_CURVE_CONTENT | ICON_1_URL | /app/nextPage |
| BB_CURVE_CONTENT | ICON_2 | /images/icon_2.png |
| BB_CURVE_CONTENT | ICON_2_URL | http://mobile.acompany.com/content1 |
| BB_CURVE_CONTENT | TEXT_LINK_1 | "News" |
| BB_CURVE_CONTENT | TEXT_LINK_1_WORDS | /app/nextPage |
| BB_CURVE_CONTENT | TEXT_LINK_2 | "Weather" |
| BB_CURVE_CONTENT | TEXT_LINK_2_WORDS | http://mobile.acompany.com/content1 |
| BB_CURVE_CONTENT | TEXT_LINK_2_ON | Yes |

METHOD AND SYSTEM FOR PROVIDING CONTENTS AVAILABLE ON THE INTERNET TO MOBILE HANDSET

FIELD OF THE INVENTION

The present subject matter relates to a method and a system for effectively providing contents available on the Internet to a mobile handset, for example, with optimizing of the contents appropriate for a specific model of the mobile handset.

BACKGROUND

Wireless communication devices, such as mobile handsets, pagers, smart phones and other two-way messaging devices (hereinafter "mobile handsets"), have had the capability to send/receive data and/or voice via a wireless communication system. Besides this basic wireless communication functionality, other technical achievements have been integrated onto the mobile handsets. In recent years, as the speeds of wireless communication equipment and the speed of processors increased, the mobile handsets have been provided with Internet access via web browsers or application software tailored to the wireless communication. While the Internet access is available in the mobile handsets, the mobile handsets cannot make full use of Internet contents or services at the same level as desktop PCs or laptop PCs accessible to the Internet via landlines because limited resources of the mobile handsets. The speeds of processors in the mobile handsets and the data transmission speeds of wireless communication are slower than those of processors in the desktop or laptop PCs and landline communication. As another example, the small-size display of the mobile handset cannot display all components of a webpage that may be available to the PCs.

As a way to overcome the limited resources of the mobile handsets in the speeds of the processors and data transmissions, small-size mobile web browsers specific to the mobile handsets have been developed to render webpages on the mobile handset. The mobile web browser effectively expands capability of relatively small resources of a mobile handset's memory and improves processing speed.

Alternatively, wireless communication service providers provide mobile handsets with landing webpages which enable the mobile handset users to experience portal-like web services in their web browsers, even using the limited handset resources. The landing webpage includes various icons such as "News," and "Sports," by selection of which the web browser browses a predetermined web page hyperlinked to the selected icon. To allow the mobile handsets to enjoy portal-like web services via the landing webpages, the wireless communication service providers have application servers to handle activities requested by the mobile handsets and databases to store resources for providing the landing webpages. The application servers have to restart instances of applications and load resources stored in the databases whenever the mobile handset users request any webpages by clicking icons on the landing webpages. Since the restarting of applications and loading of resources are time-consuming operations, the mobile handset users experience unwanted service disruptions of currently running applications after requesting the webpages and thus cannot enjoy the Internet contents or services at the same speed as in the PCs.

A need exists for enabling mobile handset users to experience the Internet contents or services as fast as the desktop or laptop PC users do. Another need exists for providing the Internet contents or services to the mobile handset without disruption of currently-running applications.

SUMMARY

The teachings herein address one or more of the above noted needs relating to a method and a system for providing contents available on the Internet to a mobile handset.

The teachings below encompass a method for providing content available on the Internet to a mobile handset. Template and mapping information specific to a plurality of models of mobile handset is preloaded at an application server before receiving a request for content from the mobile handset. After receiving the request for content from the mobile handset, the method identifies a model of the mobile handset. The requested content is fetched at the application server, and the fetched content is optimized according to the pre-loaded template and mapping information specific to the identified model of the mobile handset. The optimized content is provided to the mobile handset, and the content is rendered on the mobile handset for display.

The application server loads the template and mapping information specific to the model of the mobile handset in the application server's memory such as a volatile memory (RAM). The fetched content available on the Internet may be obtained from an external content providing server.

The content provided to the mobile handset may take the form of HyperText Markup Language (HTML) type web page. The optimization of the fetched content includes disabling some components the HTML web page depending upon the template and mapping information that are not available to the model of the mobile handset owing to size of the content or lack of support of the fetched content component (s) on the particular model of the mobile handset.

Another aspect of the disclosure encompasses a server for providing contents available on the Internet to a mobile handset via a wireless communication network. The system includes a memory for loading template and mapping information specific to the model of the mobile handset from a database storing template and mapping information specific to each of various handset models, and an optimizing unit for optimizing a content being provided from a content providing server according to the template and mapping information. The template and mapping information specific to the model of the mobile handset is loaded into the memory before the mobile handset sends a request of the content to the server.

The content may be a HTML type webpage including a header, a body, a title, an advertisement and a hypertext-linked icon. The optimizing unit disables some portions of HTML type webpage according to the template and mapping information specific to the model of the mobile handset. The server identifies the model of the mobile handset which requests the content upon receiving the request from the mobile handset.

Another aspect of the disclosure encompasses a system for providing contents available on the Internet to a mobile handset via a wireless communication network. The system comprises a web server for receiving and forwarding a request of content received from the mobile handset, a content providing server for providing the requested content, and an application server for loading template and mapping information specific to model of the mobile handset before receiving the request of content from the web server.

The application server identifies a model of the mobile handset that requests the content upon receiving the request of the content, optimizes the content provided from the content providing server according to the pre-loaded template and mapping information specific to the identified model of the mobile handset, and provides the optimized content to the mobile handset via the wireless communication network.

The content may be a HTML type webpage including a header, a body, a title, an advertisement and a hypertext-linked icon. The optimizing unit disables some portions of HTML type webpage according to the template and mapping information specific to the model of the mobile handset.

Another aspect of the disclosure encompasses an article of manufacture which comprises a machine readable storage medium, and programming instructions embodied in said medium for execution by at least one computer. By the execution of the programming instructions, the application server receives a request of a content from the mobile handset. The server stores template and mapping information specific to each of a number of models of mobile handset. The server identifies a model of the mobile handset which requests the content. The requested content is fetched at the application server, the fetched content is optimized according to pre-loaded temple and mapping information specific to the identified model of the mobile handset; and the optimized content is provided to the mobile handset.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTIONS OF DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitory have been described at a relatively high-level, without detail, in order to avoid unnecessarily obscuring aspects of the present teachings.

The examples described below encompass a technique that provides contents or services obtainable over the Internet to wireless mobile communication devices in a quick effective manner. A wireless communication service provider's application server pre-loads configurations and templates appropriate for diverse wireless communication device models in its memory. The application server optimizes and provides the requested contents or services by a particular type or model of wireless communication device according to the pre-loaded configuration and template for that model of device. The wireless communication devices receive the optimized contents or services and render the contents or services for display. The pre-loaded configuration and templates specific to each of the wireless communication devices in the server memory enables the wireless communication devices to avoid disruption of currently running services and delay in rendering the requested contents or services.

Figure 1:
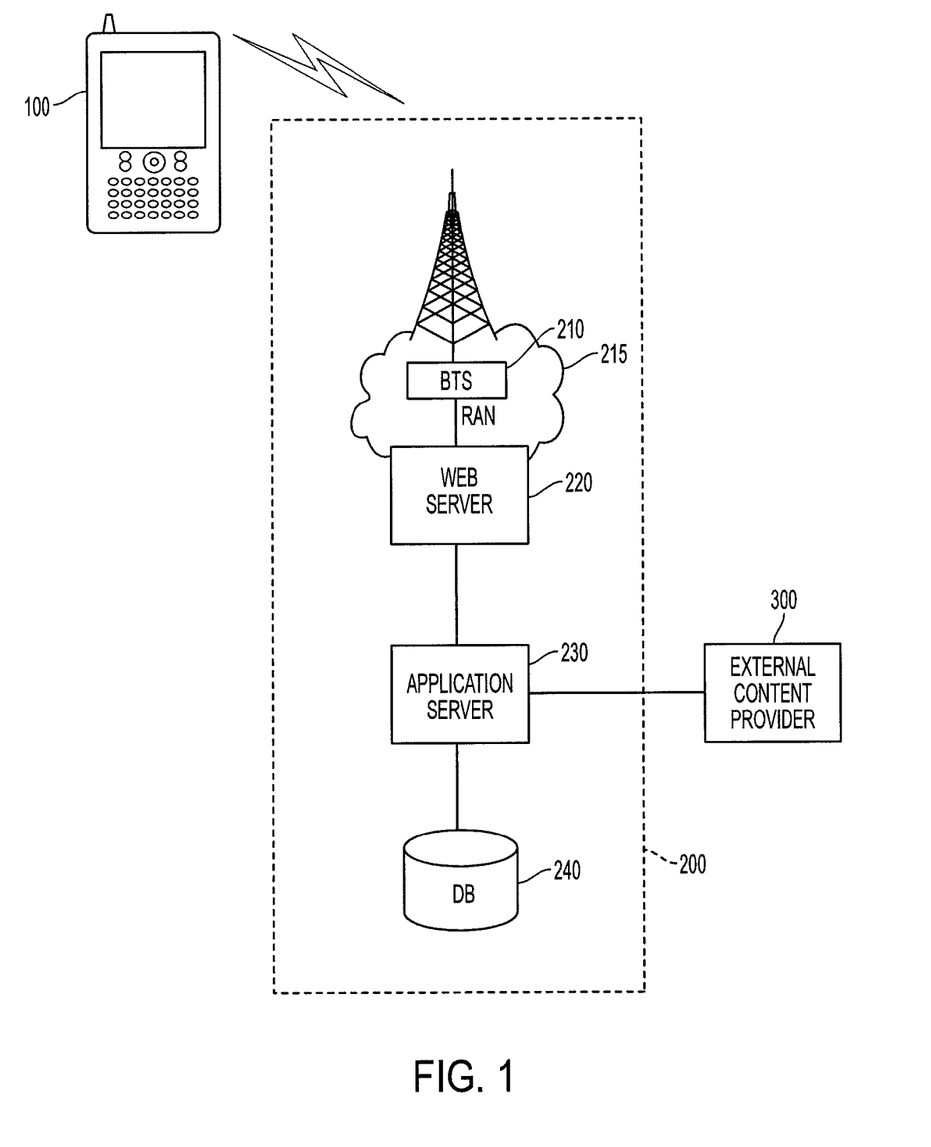
FIG. 1 illustrates an exemplary system for providing wireless Internet services to mobile handsets.

FIG. 1 illustrates an exemplary system for providing wireless Internet services to mobile handsets. A mobile handset 100 has a wireless communication link to a wireless communication service network 200 via a Base Transceiver Station (BTS) 210 at a cell site of a Radio Access Network (RAN) 215. The RAN 215 is a wireless network for providing wireless communication services to the wireless communication device 100 in various types of wireless communications such as Global System for Mobile communications (GSM), Code Division Multiple Access (CDMA), and Time Division Multiple Access (TDMA). The BTS 210 is an equipment that facilitates wireless communication between the mobile handset 100 and the wireless communication network. The BTS 210 includes equipment for encrypting and decrypting communications, spectrum filtering tools (band pass filters), modulation and demodulation, amplification, etc., for processing signals going to and coming from the cell cite and antennas.

The wireless communication service network 200 includes a number of RANs 215 and a number of additional components for providing wireless communication (not shown in FIG. 1). The exemplary service provider network 200 also includes a web server 220, an application server 230 and a database 240. External content providing servers 300 provide various Internet contents or services to the wireless communication device 100 via the wireless communication network 200. Although not shown, the server(s) of the external content providers communicate with one or more of the servers of network 200 via the Internet or via a private data network (intranet).

The wireless communication device 100 may take many forms. For example, some mobile handsets may be mobile telephone stations, at least some with enhanced display and user input capabilities to support browsing and other data communications applications in addition to voice telephone service. Many high end devices offering enhanced features are referred to as "smart phones." Other mobile handsets 100 may comprise Portable Digital Assistants (PDAs) with built-in wireless communication capabilities. As another alternative, a wireless device such as a mobile transceiver having data communication capabilities may be connected to or incorporated into a portable computing device such as a handheld or laptop type computer. The wireless communication device 100 is referred as "mobile handset," for description purpose.

Figure 2:
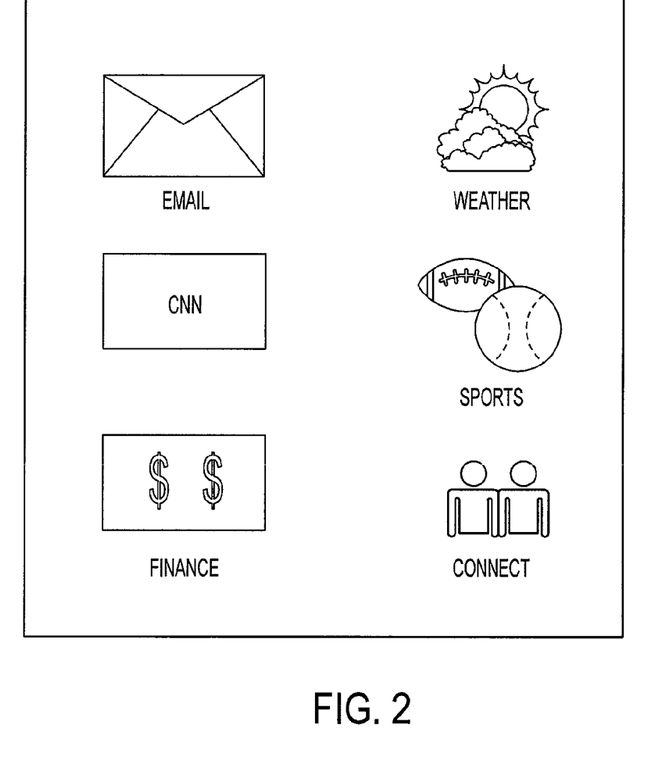
FIG. 2 illustrates an example of the landing page displayed on the mobile handset, for example, as may be optimized and provided to a mobile handset using the techniques described herein.

The network 200 and mobile handsets offer an increasingly varied array of voice, text and multimedia services. Discussion here focuses on services involving content presentations to a user via the mobile handset, for example, via a browser type user interface. For example, the mobile handset 100 displays a landing page which enables the mobile handset user to experience a portal-like environment of conveniently accessing world wide web and other Internet content. FIG. 2 illustrates an example of the landing page displayed on the mobile handset 100, for example, when the user activates the browser application on the mobile handset to access Internet content. The exemplary landing page includes icons for "EMAIL," "WEATHER," "CNN®," "FINANCE," "SPORTS," and "CONNECT." Selection of each of the icons fetches webpages linked to the icons. For example, selection of "CNN®" icon renders a frontpage of the CNN website for display on the mobile handset. Since it is relatively inconvenient for the mobile handset user to input characters on the mobile handset 100 compared with the desktop PCs or laptop PCs, the landing page makes it convenient for the mobile handset users to access any websites. The webpage fetched by selection of the icons have more simple and concise forms than those rendered on the PCs during web surfing. In addition to the websites or resource of contents represented by the icons in the landing webpage, other websites are accessible by inputting URLs via the mobile handset 100.

Still referring to FIG. 1, the web server 220 accepts and routes requests for contents from the mobile handset 100 in the form of HTTP requests, and serves responses along with optional data contents to the mobile handset 100. The content delivered from the web server 220 usually takes the form of web pages such as HTML documents and linked objects (images, etc.). The application server 230 performs functions required for rendering the contents or services requested by the mobile handset 100 on the mobile handset 100. The application server 230 receives the requests of contents from the web server 220. In response to such a request, the application server 230 identifies a model of the mobile handset 100 from the request for contents, and that server 230 requests an external contents or services provider 300 identified in the requests to provide contents or services.

The application server 230 receives the contents from the external content providing server 300. The server 230 optimizes the received contents appropriate for the particular model of the mobile handset 100 that requested the content, based on the template and mapping information for that model in the memory of the server 230.

Regardless of the content requests of the mobile handset 100 or before receiving the content requests, the application server 230 fetches all the templates and mapping information for various mobile handset models from the database 240 and loads all the templates and the mapping information for the varous mobile handset models into its memory, e.g. Random Access Memory (RAM), when the application server 230 starts or updates its memory.

The application server 230, then, sends optimized content to the mobile handset 100. The external content providing server 300 is a resource server for providing requested contents to the mobile handset 100, such as a News providing server or a Sports information providing server.

Figure 3:
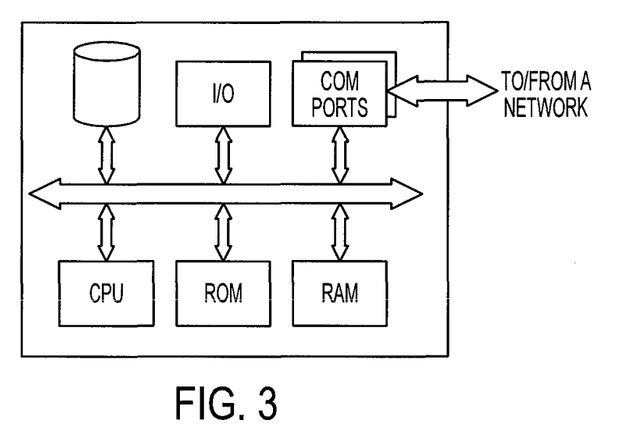
FIG. 3 illustrates a server used to implement the web server, the application server, and the external content providing server of FIG. 1.

The web server 220, the application server 230 and the external content providing server 300 may be software type applications running on one hardware server platform or may rim on separate hardware server platforms to perform above-described functions. Although only one server of each type is shown, for convenience, an actual deployment may include multiple instances of each type of server to handle expected traffic volumes. FIG. 3 illustrates a server platform, as may typically be used to implement the web server 220, the application server 230, and/or the external content providing server 300. A server computer platform, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms distribute the processing load.

Figure 4:
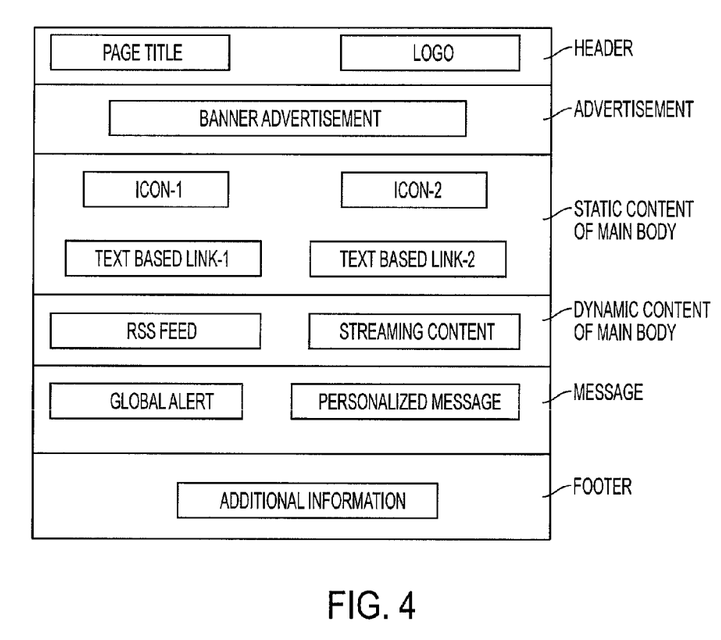
FIG. 4 illustrates components of an example of a typical webpage.

The database 240 stores templates and mapping information on how to optimize web pages to be rendered on the mobile handset 100 appropriate for each of the different models of mobile handset 100 used by the service provider's customers. Although shown separately, for convenience, the database 240 may reside in storage in one of the hardware platforms operating at one of the servers, such as the application server 230. For purpose of description of the templates and the mapping information, content components in a typical webpage are explained with reference to FIG. 4. The typical webpage includes a page title and a log in a section of header, banner advertisement, icons and text-based links. User 'clicking' of any icon or link opens another linked webpage for display. The exemplary webpage also includes a Really Simple Syndication (RSS) feed and a streaming content in the main body of the webpage. The page may include a global alert and a personal message sections, and any additional information in the footer of the webpage. While the typical webpage may not include all of the above-listed components, the exemplary webpage illustrates typical components of the webpage.

While PCs can render all of the components of the typical webpage, it is unrealistic and inefficient for a mobile handset 100 to view all of the components of the typical webpage because it takes long time for the mobile handset 100 to download and render all of the components of the typical webpage owing to limited speeds of data transmission in the wireless network and of processor in the mobile handset 100. Also, the small size display of the mobile handset 100 may make it difficult to view all components of the webpage otherwise available on PCs. In this regard, the mobile handset 100 needs to display some of the components of the webpage illustrated in FIG. 4 but not all. Since various models of the mobile handset 100 have different configurations for downloading, rendering, and displaying webpages, components of the webpages to be displayed varies depending upon models of the mobile handsets 100.

Figure 5:
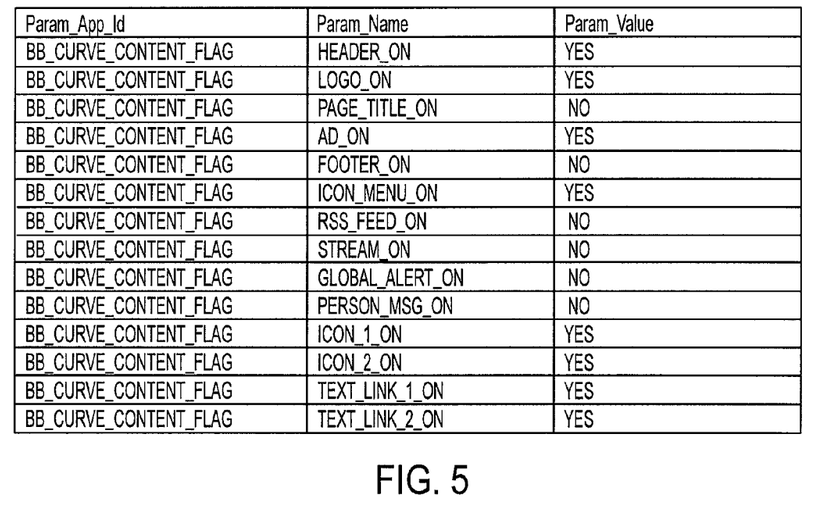
FIG. 5 shows mapping information of a specific mobile handset model.

Referring to FIG. 5, the database 240 stores mapping information on which components of the typical webpage are included or not in a webpage to be displayed on the mobile handset 100 according to the model of the particular mobile handset. Similar mapping information is stored for each model of mobile handset. FIG. 5 illustrates mapping information in a case in which the mobile handset 100 is a Blackberry Curve® model. According to the mapping information in FIG. 5, the page title, the footer, the RSS feed, the streaming content, the global alert and the personal message sections are not available on the Blackberry Curve® model.

Figure 6:
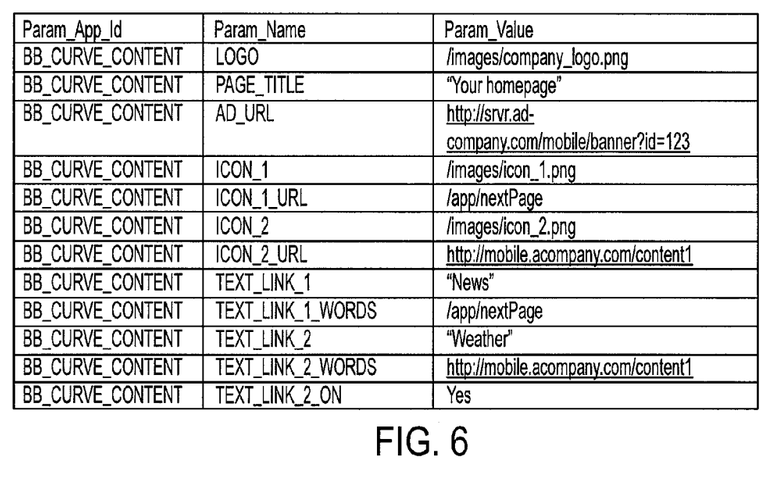
FIG. 6 depicts template information of a landing page provided on the mobile handset in case of the specific mobile handset model.

The database 240 also stores template information for each of models of mobile handsets 100. FIG. 6 illustrates template information of an exemplary webpage, such as may be provided on the mobile handset 100 of the Blackberry Curve® model. With reference to FIG. 6, the template of the webpage includes components available on the Blackberry Curve® model as disclosed in mapping of FIG. 5, texts for some components such as the title, text-based links, resource locations of the logo and icons, and Uniform Resource Locators (URLs) for the icon and text-based links. Flags (Param_Value) in FIG. 5 indicate whether some particular components are needed or not. The flags thus have either of two values Yes or No, which represents necessity of the particular components. Parameters (Param_Name) in FIG. 6 contains a piece of information corresponding to the particular components. For example, the flag (AD_ON) for the advertisement indicates "YES," which means the advertisement component is included. The application looks to the table in FIG. 6 to obtain a relevant value for the advertisement, and retrieves the information contained in a URL indicated by the AD_URL.

Figure 7:
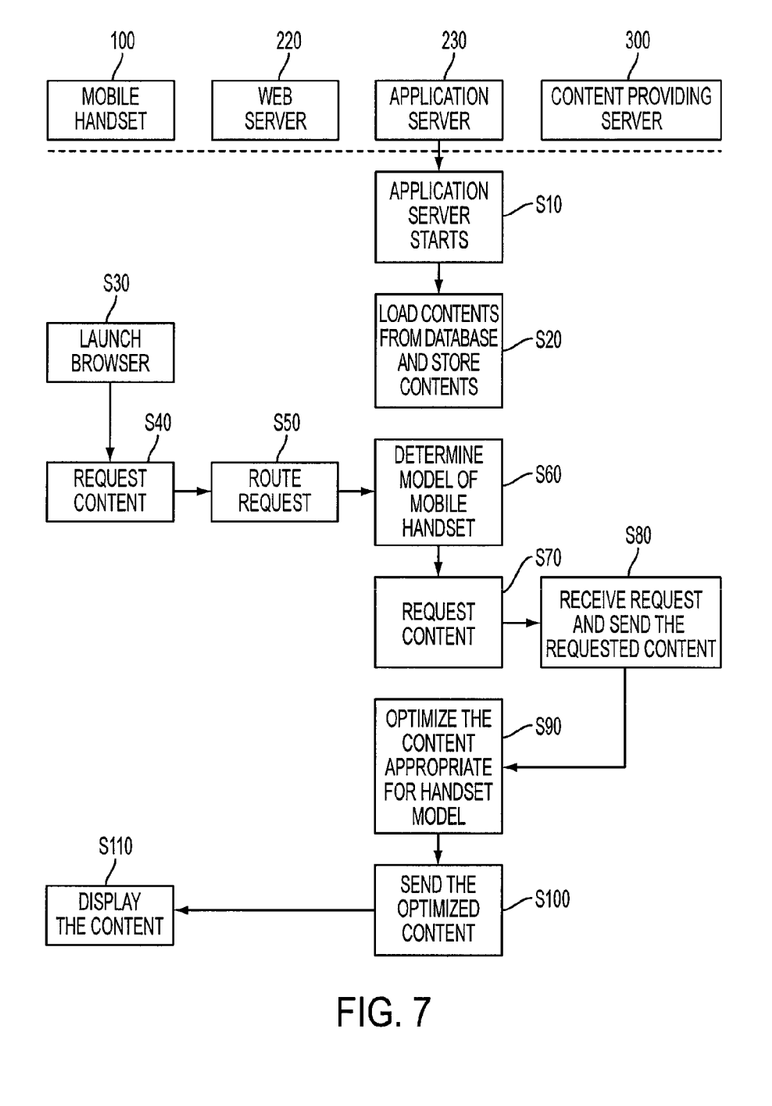
FIG. 7 is a flow diagram of a method for providing webpages to a mobile handset by employing the system of FIG. 1.

FIG. 7 is a flow diagram of a method for providing webpages on a mobile handset by employing the system of FIG. 1. The application server 230 starts manually or automatically regardless of mobile handset's activities (e.g. requests for webpages). (S10) After start of the application server, the application server 230 is ready to serve any mobile handset's requested activities. Upon its start, the application server 230 loads contents stored in the database 240 and stores the loaded contents in its memory (e.g. RAM or cahe). The loaded contents include templates of various mobile handset models and mapping information of the templates. (S20) As described above, various mobile handset models have their own webpage template requirement which does not allow some portions of the typical webpage components to be rendered. The application server 230 loads the templates and mapping information for each of the various mobile handsets into its RAM before the mobile handset 100 requests webpages, thus making the server ready to serve the mobile handset's requests of webpages without need for the application server 230 to start in response to every mobile handset's requests of webpages. Since the templates and mapping information for various mobile handset models are pre-loaded into the application server's memory before receiving and serving requests of contents from the mobile handset 100, the template and mapping information may be updated or changed at any time by changing the templates and mapping information stored in the database 240 without interruption of any services provided to the mobile handset 100.

Separate from the start operation of the application server 230, the mobile handset 100 launches its web browser (S30). The mobile handset's web browser is a web browser designed for use on the mobile handsets 100. The mobile web browsers are optimized so as to display web contents most effectively for small screens on the mobile handsets 100. Mobile web browser software must be small and efficient to accommodate the low memory capacity and low-bandwidth of wireless handheld devices. Such a browser may be is implemented by language or application such as CSS 2.1, JavaScript and Ajax. Mobile web browsers have diverse types such as Blazer (Palm), Symphony (Motorola), Safari (Apple), depending upon models of the mobile handsets 100. Upon launching of the mobile web browser, the mobile handset 100 is provided with a landing webpage as disclosed in FIG. 2, which enables the mobile handset user to experience portal-like web environment by clicking icons of the landing webpage. The landing webpage may be pre-installed in the mobile handset 100 and may be displayed upon start of web browsing at the mobile handset 100.

The mobile handset user requests a webpage to be rendered on the mobile handset 100 by clicking one of the icons in the landing webpage or by inputting an exact URL. (S40) The request takes the form of a HTTP request. The request of the webpage from the mobile handset 100 is transmitted to the web server 220 via the mobile wireless communication link and elements of the network 215. The web server 220 receives and routes the request of the webpage to the application server 230. (S50)

The application server 230 receives the request for the webpage from the web server 220 and identifies the model or type of the mobile handset 100, from header of the HTTP type request of the webpage. (S60) The application server 230 fetches a template appropriate for the identified type of the mobile handset 100 from pre-loaded templates and mapping information in its RAM.

On the other hand, the application server 230 extracts destination of the request from the header of the HTTP type request for the webpage and send the request to the addressed destination, i.e. the external content providing server 300, to provide the requested contents or services. (S70) The external content providing server 300 receives the request for the contents or services and sends the requested contents or services to the application server 230. (S80) The contents or services may be provided to the application server in the form of the typical webpages having diverse components, such as those shown in FIG. 4. Communications between the web server 220, the application server 230 and the external content providing server 300 are performed on a Transmission Control Protocol/Internet Protocol (TCP/IP) based network (not separately shown).

After receiving the requested webpage, the application server 230 optimizes the requested webpage appropriate for display on the mobile handset 100 based on the pre-fetched template and mapping information from the application server's RAM in the step of S60. (S90) The optimization of the webpage disables components of the webpage according to the pre-loaded template and mapping information for the model of the mobile handset 100 that requested the web-page. The components set forth in the mapping information are not available for the model of mobile handset 100 for the reason of e.g. technical non-availability of the components in the specific model of the mobile handset 100, excessive expense of resources by the components and the like as disclosed in FIG. 5. The mapping information sets forth locations of components of specific pages as disclosed in FIG. 6.

After optimizing the requested webpage, the application server 230 sends the optimized webpage to the mobile handset (S100). After receiving the optimized webpage, the optimized webpage is displayed on the mobile handset 100. (S110) Since the template and mapping information referred to by the application server 230 during optimization of the requested webpage are pre-loaded in the application server's RAM, the application server 230 does not have to restart by itself or confer with the database 240 to obtain the template and mapping information of mobile handsets 100 appropriate for the model of the mobile handset 100 every time the mobile handset 100 requests webpages. The avoidance of referring to the database 240 or restarting of the application server 230 increases speed of rendering the requested webpage on the mobile handset 100 and does not have to force pre-running application on the mobile handset to be disrupted.

Figure 8:
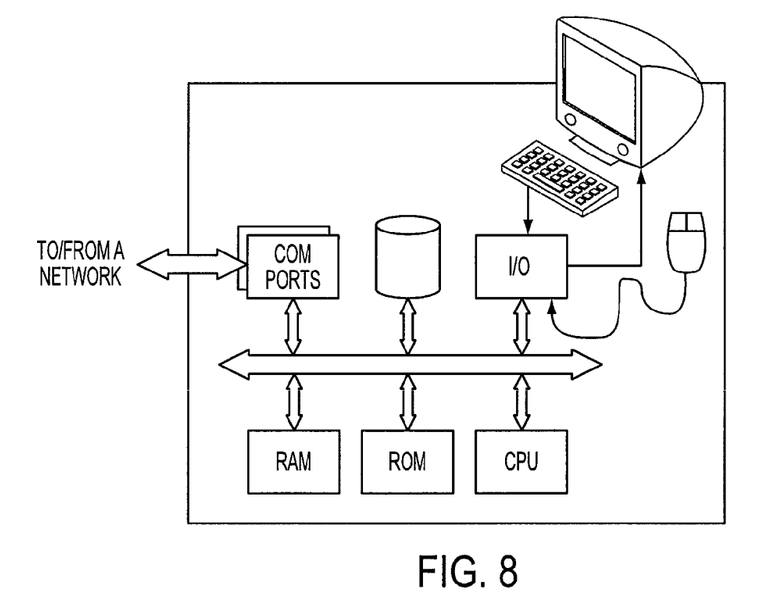
FIG. 8 depicts a computer with user interface elements, as may be used to implement a personal computer or other type of work station.

As shown by the above discussion, functions relating to the providing contents available in the Internet to the mobile handset may be implemented on computers (examples shown in FIGS. 3 and 8) connected for data communication via the components of a packet data network. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the application server, or the web server. The software code is executable by the general-purpose computer that functions as the application server and/or that functions as the web server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for providing contents to the mobile handset appropriate for the model of the mobile handset, in essentially the manner performed in the implementations discussed and illustrated herein.

Hence, aspects of the methods of providing contents to the mobile handset appropriate for the model of the mobile handset outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of the application server and the web server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the method for providing contents to the mobile handset, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for providing content available on the Internet to a mobile handset, the method comprising steps of:
    (a) receiving a request for content available on the Internet from the mobile handset, at an application server, the application server storing template and mapping information specific to each of a plurality of models of mobile handset;
    (b) identifying a model of the mobile handset;
    (c) fetching the requested content at the application server;
    (d) optimizing the fetched content according to template and mapping information specific to the identified model of the mobile handset;
    (e) providing the optimized content to the mobile handset; and
    (f) loading the template and mapping information on the application server, as pre-loaded template and mapping information, before receiving the request for the content from the mobile handset,
    wherein:
    the fetched content includes a web page;
    the optimizing step (d) further comprises steps of:
        determining whether one or more components of the web page are to be displayed on the mobile handset, based on information of the identified model of the mobile handset and flags corresponding to the one or more components of the web page to be displayed on the mobile handset; and
        based on a result of the determination step, modifying the fetched content for display on the mobile handset.

2. The method of claim 1, wherein, in the loading step, the application server stores the template and mapping information specific to the model of the mobile handset in memory of the application server.

3. The method of claim 1, wherein, in the step (c), the fetched content available on the Internet is obtained from an external content providing server.

4. The method of claim 1, wherein the content provided to the mobile handset takes the form of a HyperText Markup Language (HTML) type web page.

5. The method of claim 4, wherein the step (d) disables some components of the HTML web page depending upon the template and mapping information.

6. The method of claim 1, further comprising:
fetching the template and mapping information for the plurality of models of mobile handset from a database; and
loading the fetched template and mapping information for the plurality of models of mobile handset into a memory of the application server, before receiving the request for content available on the Internet from the mobile handset or regardless of the request for the content.

7. The method of claim 1, wherein the template information specific to the identified model of the mobile handset includes texts, icons, or Uniform Resource Locations (URL) links.

8. The method of claim 1, wherein each of the flags corresponding to the one or more components indicates whether the corresponding component is needed or not for display on the mobile handset.

9. The method of claim 1, wherein regardless of the content request of the mobile handset, the application server fetches all the template and mapping information for various mobile handset models from a database and loads the template and mapping information for various mobile handset models into memory of the application server.

10. The method of claim 1, wherein the flags comprise parameters and parameter values, wherein each parameter corresponds to a particular component of the web page.

11. The method of claim 10, wherein each parameter value indicates whether the particular component associated with the parameter is to be displayed on the mobile handset as part of an optimized content of the web page.

12. A server for providing content available on the Internet to a mobile handset via a wireless communication network, the server including:
a memory for loading template and mapping information specific to model of the mobile handset from a database storing template and mapping information specific to each of a plurality of handset models; and
an optimizing unit for optimizing content available on the Internet, which is provided from a content-providing server according to the template and mapping information specific to the model of the mobile handset,
wherein the template and mapping information specific to the model of the mobile handset is loaded into the memory from the database before receiving a request from the mobile handset for the content, and the model of the mobile handset is identified upon receiving the request from the mobile handset;
wherein the optimizing unit is configured to determine whether one or more components of a web page of the content are to be displayed on the mobile handset, based on information of a model of the mobile handset and flags corresponding to the one or more components of the web page to be displayed on the mobile handset, and
wherein, based on a result of the determining step of the optimizing unit, the optimizing unit is further configured to modify the content for display on the mobile handset.

13. The server of claim 12, wherein the content is a HyperText Markup Language (HTML) type webpage including a header, a body, a title, an advertisement and a hypertext-linked icon.

14. The server of claim 13, wherein the optimizing unit disables some portions of the HTML type webpage according to the template and mapping information specific to the model of the mobile handset.

15. A system including at least a processor and a memory for providing content available on the Internet to a mobile handset via a wireless communication network, the system comprising:
a web server configured to receive and forward a request for content available on the Internet received from the mobile handset;
an application server configured to receive the request for content from the web server and to load template and mapping information specific to model of the mobile handset from a database storing template and mapping information specific to each of a plurality of handset models before receiving the request for content from the web server; and
a content-providing server configured to provide the requested content to the application server,
wherein the application server is configured to identify a model of the mobile handset that requests the content upon receiving the request for the content, optimize the content to be provided to the mobile handset according to the pre-loaded template and mapping information specific to the identified model of the mobile handset, and provide the optimized content to the mobile handset via the wireless communication network; and
wherein the application server is further configured to determine whether one or more components of a web page of the content are to be displayed on the mobile handset, based on information of a model of the mobile handset and flags corresponding to the one or more components of the web page to be displayed on the mobile handset, and to modify the content for display on the mobile handset based on a result of the determination.

16. The system of claim 15, wherein the content is a HyperText Markup Language (HTML) type webpage including a header, a body, a title, an advertisement and a hypertext-linked icon.

17. The system of claim 16, wherein some portions of the HTML type webpage are disabled for optimization according to the template and mapping information specific to the model of the mobile handset.

18. An article of manufacture, comprising:
a non-transitory computer readable storage medium; and
programming instructions embodied in the medium for execution by at least one computer, wherein the execution of the programming instructions by the at least one computer configures the at least one computer to perform functions, comprising functions to:
(a) receive a request for content available on the Internet from the mobile handset, at an application server, the application server storing pre-loaded template and mapping information specific to each of a plurality of models of mobile handset;
(b) identify a model of the mobile handset;
(c) fetch the requested content at the application server;
(d) optimize the fetched content according to template and mapping information specific to the identified model of the mobile handset; and
(e) provide the optimized content to the mobile handset;
wherein:
the fetched content includes a web page; and
the optimizing function (d) further comprises functions to:

determine whether one or more components of the web page are to be displayed on the mobile handset, based on information of the identified model of the mobile handset and flags corresponding to the one or more components of the web page to be displayed on the mobile handset; and based on a result of the determination, modify the fetched content for display on the mobile handset.

19. The article of claim 18, wherein the execution of the programming instructions further configures the at least one computer to load the template and mapping information on the application server before the request for the content from the mobile handset is received.

20. The article of claim 19, wherein, in the loading function, the application server stores the template and mapping information specific to the model of the mobile handset in memory of the application server.

21. The article of claim 18, wherein, in the function (c), the fetched content available on the Internet is obtained from an external content providing server.

22. The article of claim 18, wherein the content provided to the mobile handset takes the form of a HyperText Markup Language (HTML) type web page.

23. The article of claim 22, wherein the function (d) disables some components of the HTML web page depending upon the template and mapping information.

24. The article of claim 18, wherein the function (a) is performed before receiving the request for the content from the mobile handset.

25. The article of claim 18, wherein, in the function (a), the application server loads the template and mapping information specific to the model of the mobile handset in the application server's memory.

26. The article of claim 18, wherein the content provided to the mobile handset takes the form of a HyperText Markup Language (HTML) type web page.

27. The article of claim 26, wherein the function (e) disables some components of the HTML web page depending upon the template and mapping information.

* * * * *